United States Patent [19]
Crouch

[11] 3,884,648
[45] *May 20, 1975

[54] PROCESS FOR MAKING A REDUCING GAS

[75] Inventor: William B. Crouch, Whittier, Calif.

[73] Assignee: Texaco Inc., New York, N.Y.

[*] Notices: The portion of the term of this patent subsequent to Oct. 8, 1991, has been disclaimed.

[22] Filed: June 28, 1972

[21] Appl. No.: 266,934

[52] U.S. Cl.............. 48/197 R; 48/200; 48/215; 252/373
[51] Int. Cl............................................. C01b 2/14
[58] Field of Search.......... 48/197 R, 200, 212, 213, 48/215; 252/373

[56] References Cited
UNITED STATES PATENTS

| | | | |
|---|---|---|---|
| 2,809,104 | 10/1957 | Strasser et al. | 48/214 |
| 3,620,698 | 11/1971 | Schlinger et al. | 48/200 X |
| 3,620,699 | 11/1971 | Reynolds et al. | 48/212 X |
| 3,738,940 | 6/1973 | Auer et al. | 48/215 X |
| 3,743,488 | 7/1973 | Bogart | 48/215 X |
| 3,743,606 | 7/1973 | Marion et al. | 48/215 X |

Primary Examiner—S. Leon Bashore
Assistant Examiner—Peter F. Kratz
Attorney, Agent, or Firm—T. H. Whaley; C. G. Ries; Albert Brent

[57] ABSTRACT

Gaseous mixtures comprising hydrogen and carbon monoxide are produced continuously in the reaction zone of a free-flow unpacked gas generator by the noncatalytic partial oxidation of a dispersion of liquid hydrocarbonaceous fuel in a methane-rich gas carrier, e.g., natural gas plus a relatively small amount of steam with a free-oxygen containing gas. The effluent gas from the gas generator is produced having a comparatively high reducing ratio. That is, the mole ratio $H_2+CO/H_2O+CO_2$ of the product gas is at least about 9. For a given soot level, it was unexpectedly found that this reducing ratio is greater than the reducing ratio of product gas from a natural gas fired gas generator or the product gas from a liquid hydrocarbon fired gas generator in which only steam was used as the temperature moderator. Further, in comparison with the case where a liquid hydrocarbon fuel is dispersed in a natural gas carrier without the supplemental addition of steam, the addition of the relatively small amounts of steam to the natural gas carrier in the subject invention causes a favorable drop in gas generator temperature and the free-oxygen consumption is reduced, while the net $H_2+CO$ produced is increased.

9 Claims, No Drawings

PROCESS FOR MAKING A REDUCING GAS

BACKGROUND OF THE INVENTION

FIELD OF THE INVENTION

This invention relates to the production of gaseous mixtures comprising principally carbon monoxide and hydrogen. More particularly, it relates to improvements in the partial oxidation process for continuously producing a gas mixture having a reducing ratio of at least about 9 and is suitable for use as a reducing gas, fuel gas or synthesis gas.

DESCRIPTION OF THE PRIOR ART

The mole ratio ($H_2+CO/H_2O+CO_2$) of a gas mixture is commonly referred to by the term "reducing ratio." The reducing ratio is a measure of the efficiency of a gas mixture when used as a reductant; and the higher the reducing ratio the greater the efficiency.

Liquid and gaseous hydrocarbon fuels have been reacted with oxygen by partial oxidation with or without steam and without a catalyst to produce gaseous mixtures comprising principally $H_2$ and CO and containing a small amount of $CO_2$, $H_2O$ and particulate carbon. When liquid hydrocarbon fuels such as heavy fuel oil are used without steam as feedstock to the partial oxidation generator, combustion chamber temperatures become excessive. However, when steam is added to the feed gas mixture, as a temperature moderating gas, the reducing ratio is lowered. When natural gas is used as the sole feed to the partial oxidation generator, high feedstream preheat levels and high oxygen/fuel ratios are required to reduce the methane content of the product gas to acceptable levels, and a reducing ratio of less than about 8.5 may be expected. Coassigned U.S. Pat. No. 2,698,782 to C.A. Coghlan discloses in the preparation of motor gasoline burning natural gas and oil-carbon slurries with steam injected to moderate excessive combustion temperatures. By such a process the gas produced would have a low reducing ratio. By means of the subject invention the aforesaid disadvantages of prior art processes are substantially overcome.

SUMMARY OF THE INVENTION

This is a continuous process for producing gaseous mixtures comprising hydrogen and carbon monoxide suitable for use as a reducing gas, fuel gas, or synthesis gas.

Into the reaction zone of a free-flow unpacked non-catalytic gas generator there are introduced a free-oxygen containing gas and a disperson of a liquid hydrocarbonaceous fuel in a methane-rich gas plus a relatively small amount of steam. The free-oxygen containing gas comprises 0.6 to 1.2 atoms of free-oxygen per atom of carbon present in the reaction zone. The amount of free-oxygen is limited so as to produce a maximum amount of CO. The charge is reacted by partial oxidation in said reaction zone at an autogenous temperature in the range of about 1,500° to 3,500°F. and at a pressure in the range of atmospheric to 3,500 psig. The effluent gas stream leaving the reaction zone substantially comprises $H_2$, CO, $H_2O$, $CO_2$ and particulate carbon in the amount of about 0.01 to 20 percent by weight of carbon in the liquid hydrocarbon. The mole ratio $H_2+CO/CO_2+H_2O$, also known as the reducing ratio, of the effluent gas is at least about 9.

By means of the subject invention an unexpected but desirable result is obtained when the methane-rich gas plus a relatively small amount of steam is used as the carrier for the liquid hydrocarbonaceous fuel. For example, for a given soot level the reducing ratio of the product gas is greater than the reducing ratio of product gas from a gas generator in which only natural gas is fired or in which only liquid hydrocarbon is fired, in each case with or without the addition of supplemental $H_2O$. Further, in comparison with the case where liquid hydrocarbon fuel is dispersed in a natural gas carrier and the charge to the gas generator is free from supplemental additions of $H_2O$ or $CO_2$ other than that which is formed in the reaction zone, by means of the subject scheme the addition of a relatively small amount of $H_2O$ to the methane-rich gas carrier will produce a favorable drop in temperature in the reaction zone. Also, the free-oxygen consumption is reduced, and the net $H_2+CO$ produced per pound of fuel oil is increased.

DESCRIPTION OF THE INVENTION

The present invention pertains to improvements in the partial oxidation process for generating a mixture of gases comprising principally hydrogen and carbon monoxide from a liquid hydrocarbonaceous fuel. The product gas mixture, having a reducing ratio, i.e., mole ratio $H_2+CO/H_2O+CO_2$, of at least about 9 is useful as a gas phase reductant for the reduction of metal oxides. The product gas may be also used as a fuel gas or as a synthesis gas.

The term "liquid hydrocarbonaceous fuel" as used herein is intended to include suitable liquid hydrocarbon fuel feedstocks as liquified petroleum gas; heavy fuel oil, petroleum distillates and residua, gasoline, naphtha, kerosine, crude petroleum, reduced crude, asphalt, gas oil, residual oil, shale oil, tar-sand oil, aromatic hydrocarbons such as benzene, toluene, xylene, coal tar; cycle gas oil from fluid catalytic cracking operation, furfural extract of coker gas oil; aldehydes, ketones, alcohols, organic waste liquors having some fuel value, and mixtures thereof. Hydrocarbon oils having an API gravity less than 10° are preferred for economic reasons. Also included within the definition of liquid hydrocarbonaceous fuel are slurries of solid carbonaceous fuels in at least one of the aforementioned liquid hydrocarbon fuels. Suitable dry solid carbonaceous fuels which may be slurried include petroleum coke, shale, tar sands, coal and coke from coal.

Prior to being dispersed in the combustible methane-rich gas carrier, the liquid hydrocarbonaceous fuel may be at ambient room temperature or it may be preheated to a temperature up to about 1,200°F., but below its cracking temperature and dispensed in a relatively small amount of steam.

The methane-rich carrier gas comprises at least 22 mole percent methane and is selected from the group of combustible gas phase materials consisting of substantially pure methane (at least 95 mole percent $CH_4$), natural gas, coke oven gas, and fuel gas comprising principally $H_2$, CO, and at least 22 mole percent of $CH_4$. Further, the methane-rich gas preferably contains less than 7 mole percent of $CO_2+H_2O$. It has a gross heating value in the range of about 500 to 1200 British Thermal Units (BTU) per standard cubic foot (SCF).

The temperature of the methane-rich carrier gas prior to being mixed with the liquid hydrocarbonaceous fuel may be in the range of about ambient room temperature to 1,000°F. The weight ratio of methane-rich carrier gas to the liquid hydrocarbonaceous fuel is in the range of about 0.25 to 0.75 and preferably in the range of about 0.4 to 0.6 pounds of combustible carrier gas per pound of liquid hydrocarbonaceous fuel.

In a preferred embodiment the methane-rich carrier gas is a combustible natural gas as recovered from the earth. Natural gas is generally readily available at low cost. As used herein, the term "natural gas" by definition shall include gas mixtures which are combustible and which have a gross heating value in the range of about 400 to 4,000 BTU per SCF. Such dry combustible natural gas mixtures contain, methane in the amount of about 22 to 99.5 mole % dry basis and a gas selected from the group of gases or mixtures thereof shown in Table I.

TABLE I

|  | Mole % (Dry Basis) |
|---|---|
| Methane | 22 to 99.5 |
| Ethane | 0 to 30 |
| Propane | 0 to 70 |
| Butane | 0 to 19 |
| Pentane and heavier | 0 to 10 |
| Nitrogen | 0 to 78 |
| Carbon Dioxide | 0 to 5 |
| Hydrogen Sulfide | 0 to 6 |
| Helium | 0 to 2 |

For example, a preferably average natural gas delivered in the pipe line will have a heating value in the range of about 850 to 1,150 BTU per SCF and comprise the following composition in mole percent dry basis: methane 72.6; ethane 14.4; carbon dioxide 0.5; nitrogen 12.5.

Supplemental $H_2O$ from an external source at a temperature in the range of about ambient to 1,000°F may be added to the liquid hydrocarbon fuel or to the free-oxygen containing gas, or to both. The amount of said supplemental $H_2O$ in gaseous or liquid phase which is introduced into the reaction zone as a portion of the carrier gas is in the range of about 0.01 to 0.30 parts by weight of $H_2O$ per part by weight of combustible fuel in said reaction zone, i.e., liquid hydrocarbon fuel plus combustible gaseous hydrocarbon in the methane-rich gas carrier. Preferably, the aforesaid $H_2O$/fuel weight ratio is in the range of 0.05 to 0.20.

The free-oxygen containing gas is selected from the group consisting of substantially pure oxygen (at least about 95 mole percent of $O_2$), oxygen-enriched air (at least about 22 mole percent of $O_2$), and air. Such oxygen concentrations are readily available from commercial oxygen plants. The amounts of free-oxygen containing gas introduced into the reaction zone is limited so that the amount of free oxygen supplied is such that near maximum yields of carbon monoxide and hydrogen are obtained. Preferably, the atomic ratio of free oxygen/carbon in the fuel feed is in the range of about 0.6 to 1.2.

By means of a multipassage burner axially aligned in the gas generator, the liquid hydrocarbonaceous fuel, free-oxygen containing gas, methane-rich carrier gas, and $H_2O$ are simultaneously introduced into the reaction zone of the gas generator. The gas generator is a free-flow unpacked noncatalytic refractory-lined vertical cylindrical steel pressure vessel. For example, a suitable gas generator is depicted in coassigned U.S. Pat. No. 3,639,261 issued to William L. Slater on Feb. 1, 1972 but modified so that the hot effluent gas from the generator does not contact any water from an external source. Further, an annulus-type burner such as depicted in coassigned U.S. Pat. No. 2,928,460 issued to Du Bois Eastman may be employed to introduce the feed into the reaction zone of the generator. Preferably, the liquid hydrocarbonaceous fuel is finely atomized and dispersed in steam and the methane-rich carrier stream upstream from the burner. This may be done by conventional means. For example, a stream of $H_2O$ and methane-rich gas at a temperature in the range of about 50° to 1,000°F. is introduced into a stream of liquid hydrocarbonaceous fuel at a temperature in the range of about 60° to 1,000°F. In general, it is desirable to limit the amount of preheat of liquid hydrocarbon fuel to about 750°F. to prevent cracking.

Atomization of the liquid hydrocarbonaceous fuel may be effected by passing the mixture of liquid hydrocarbonaceous fuel, $H_2O$ and carrier gas through a relatively long tubular conduit at a velocity in excess of about 20 feet per second, and preferably in excess of 30 feet per second. Preferably, the tubular section in which the dispersion of liquid hydrocarbonaceous fuel in methane-rich gas is accomplished is heated and has a length in the range of about 100 to 500 times the inside pipe diameter so that there is turbulent flow therein.

Thus, for example, a preheated dispersion of liquid hydrocarbon fuel in natural gas and steam may be continuously passed through the annulus passage of an annulus-type burner directly into the reaction zone of the gas generator where the partial oxidation reaction takes place. The annulus-type burner essentially may comprise a center conduit and a concentric tube disposed about the center conduit providing an annular passage therebetween. The downstream or exit end of the concentric tube is preferably provided with a converging nozzle tip, so as to cause the two streams to impinge and mix with the each other beyond the burner tip. Preferably, the free-oxygen containing stream is simultaneously and continuously passed through the center conduit of the burner into impinging or mixing relationship with the dispersion of liquid hydrocarbon fuel steam and the methane-rich gas stream flowing through the annulus. Optionally, all or a portion of the $H_2O$ may be mixed with the free-oxygen containing gas to protect the center conduit from dimensional change due to erosion.

The streams contact each other preferably in the reaction zone. Mixing of the streams preferably takes place at a point located from 0 to 6 inches from the downstream face of the burner. This scheme subjects the particles of liquid hydrocarbon fuel to a further degree of subdivision. Alternately, the free-oxygen containing stream may be continously introduced into the reaction zone by way of the annulus passage of the burner and the stream of liquid hydrocarbon fuel dispersed in natural gas and steam may be introduced by way of the center passage.

The tip velocities for the stream of oxygen-containing gas and the stream of liquid hydrocarbonaceous fuel-methane-rich gas-steam dispersion are in the range of about 30 feet per second to sonic velocity, and preferably in the range of about 300 to 600 feet per second. The tip velocities for the several streams are preferably equal.

In another embodiment of this invention, the annulus burner may be provided with a second concentric tube which is disposed about said first concentric tube, providing an outer annulus therebetween. The downstream or exit end of the second concentric tube may preferably be provided with a converging nozzle tipe for controlling the direction of the gaseous stream flowing through the outer annulus. It was unexpectedly found that such an arrangement has the economic advantage of reducing the amount of particulate carbon in the product gas for a fixed amount of free oxygen supplied with the free-oxygen containing gas in the feed. The streams flowing in the center passage and inner annulus may be those as previously described. However, the gaseous stream simultaneously flowing in the outer annulus at a velocity of about 30 feet per second to sonic velocity is selected from the group consisting of air, oxygen-enriched air, nitrogen, a portion of the effluent gas from the gas generator that is cooled and recycled, and cooled cleaned and compressed off-gas from an ore reduction zone such as a blast furnace for reducing iron ore to iron. Mixing of the three streams may be facilitated by the converging nozzle tips on said first and second concentric tubes. Preferably, as previously mentioned, such mixing takes place in the reaction zone at a distance of 0 to 6 inches from the face of the burner.

Said three gaseous streams are introduced into the reaction zone of the gas generator in amounts to provide, by partial oxidation, an autogenous reaction temperature in the range of about 1,500° to 3,500°F. at a pressure in the range of about 1 to 250 atmospheres. The hot product gas leaving the reaction zone, substantially comprising $H_2$, $CO$, $CO_2$, $H_2O$ and a small amount of particulate carbon, may be cooled in a commercially available waste heat boiler. Examples of suitable waste heat boilers are depicted in coassigned U.S. Pat. No. 3,551,347 issued to F. Markert et al. on Dec. 29, 1970 and the aforesaid U.S. Pat. No. 3,639,261.

The composition of the product gas from the subject process is in the following range (mole percent): $CH_4$ 0 to 2.0; $H_2$ 40.0 to 55.0; $CO$ 40.0 to 55.0; $CO_2+H_2O$ 0.5 to 8.5; $N_2$ 0 to 20; and $H_2S$ 0 to 5.0. Included in the product gas stream is particulate carbon in the amount of 0 to 20 weight percent (basis weight of carbon in fuel).

A synergistic effect occurs when natural gas replaces most of the steam as the temperature-moderating gas in the oil-fired partial oxidation process. This effect is demonstrated in Example I below. Thus, when a liquid hydrocarbon fuel feed is entrained in natural gas and a relatively small amount of steam there is produced a product gas having a greater reducing ratio than when the feed to the generator is either natural gas alone or liquid hydrocarbon fuel with steam as the carrier. Further, the net gas-make per unit of oil fed is increased.

DESCRIPTION OF THE PREFERRED EMBODIMENT

The following examples are offered as a better understanding of the present invention but the invention is not to be construed as limited thereto.

EXAMPLE I

A gas mixture comprising principally carbon monoxide and hydrogen is produced by the partial oxidation of a dispersion of heavy fuel oil in natural gas plus a relatively small amount of supplemental steam. The heavy fuel oil has an API gravity of 13.1, a gross heating value of 18,300 BTU/pound, and an ultimate analysis in weight percent of C 85.7, $H_2$ 11.2, S 2.1, N 0.8, and ash 0.03. The dispersion of heavy fuel oil in natural gas and steam is reacted with substantially pure oxygen by the process of the present invention in a free-flow unpacked noncatalytic synthesis gas generator of the type previously described.

In the process, the dispersion of heavy fuel oil, natural gas, and steam at a temperature of about 400°F., is introduced into the reaction zone of the gas generator by way of the annulus of a conventional annulus-type burner. The oxygen, at a temperature of about 100°F. is introduced into the reaction zone by way of the center conduit of the burner. On an hourly basis, a summary of the materials, operating conditions, composition of product gas, and performance data are shown for Run No. 1 in the following Table II.

Runs 2, 3 and 4 are also shown in Table II for comparative purposes only and do not constitute examples of the subject invention. Run 2 was made under substantially the same conditions as Run 1. The feed materials to the reaction zone are also the same with the exception that no supplemental $H_2O$ from an external source was introduced into the reaction zone other than that which may be produced as a reaction product in the gas generator. Run 3 pertains to operating the partial oxidation gas generator with natural gas fuel and with no liquid hydrocarbonaceous fuel. Further, no $H_2O$ or other temperature-moderating gas is used so as to prevent the autogenous temperature in the reaction zone from falling below the level required for the reaction to continue. Run 4 pertains to operating the gas generator in substantially the same conditions as described previously for Run 2 but with a liquid hydrocarbonaceous fuel dispersed in a steam carrier and no natural gas.

Runs 1–4 have equivalent residence times in the reaction zone at constant pressure. With no carriers gas, the reaction zone of an oil-fired partial oxidation generator would reach excessively high temperatures, e.g., above 4,000°F. and the refractory lining would fail. However, when steam alone was used as the carrier for the fuel oil in Run 4, the reducing ratio of the product gas fell sharply while the free oxygen consumed per thousand standard cubic feet per hour (M SCFH) of $H_2$ + $CO$ produced increased substantially.

In ordinary practice no steam or other carrier is used when a methane-rich gas fuel such as the natural gas fuel in Run 3 is reacted as the sole fuel in a partial oxidation gas generator. This is to prevent the autogenous temperature in the reaction zone from falling below the level required to maintain the reaction. However, as shown by the data for Run 3, a large amount of natural gas is consumed in preheating the natural gas and the O/C ratio is high.

When fuel oil is introduced into the reaction zone in combination with natural gas and without any supplemental $H_2O$ from the an external source such as shown by the data for Run 2, the temperature in the reaction zone, the free-oxygen consumption per MSCF of $H_2$ + $CO$, and the reducing ratio are increased.

The unexpected and beneficial results obtained by making methane-rich gas the main carrier for the heavy fuel oil in combination with a relatively small amount of steam is readily apparent from the data for Run 1. Further, as shown, a synergistic effect is obtained.

Note under performance in Table II that in comparison with corresponding values for Runs 2-4, the oxygen/carbon ratio is lowest and the SCF of $H_2+CO$ per lb. of fuel oil is highest for Run 1. Further, in those applications where a lower reducing ratio in comparsion with Run 2 is acceptable, the subject invention affords an econmic advantage in that the yield of $H_2+CO$ is greater for given sized equipment, and the free oxygen consumption SCF/M SCF $H_2+CO$ is less.

The process of the invention has been described generally and by examples with reference to particular compositions for purposes of clarity and illustration only. It will be apparent to those skilled in the art from the foregoing that various modifications of the process and materials disclosed herein can be made without departure from the spirit of the invention.

0.25 to 0.75 parts by weight of said methane-rich gas for each part by weight of said liquid hydrocarbonaceous fuel, and said $H_2O$ being introduced in an amount in the range of about 0.05 to 0.20 parts by weight of $H_2O$ per part by weight of the combustible fuel in said reaction zone; reacting said materials by partial oxidation in said reaction zone at an autogenous temperature in the range of about 1,500° to 3,500°F. and at a pressure in the range of about 1 to 250 atmospheres; and removing from said reaction zone a product gas stream comprising $H_2$, CO, $H_2O$, $CO_2$ and particulate carbon in the amount of about 0.01 to 20 percent by weight of carbon in the liquid hydrocarbon; wherein the reducing ratio moles $H_2+CO/H_2O+CO_2$ of said product gas is at least about 9.

2. The process of claim 1 wherein said methane-rich gas is selected from the group consisting of substantially pure methane, natural gas, coke oven gas, and

TABLE II

| Run No. | REDUCING GAS GENERATION | | | |
|---|---|---|---|---|
| | 1 | 2 | 3 | 4 |
| Charge to Generator | | | | |
| Fuel | | | | |
|   Heavy Fuel Oil, lbs./hr. | 357.0 | 340.0 | — | 465.0 |
|   Natural Gas, SCFH | — | — | 9202* | — |
|   Free-Oxygen (99.5 mole % $O_2$) SCFH | 6977 | 7059 | 6089 | 6832 |
| Carrier Gas, Lbs./hr. | | | | |
|   Natural Gas | 184.96 | 176.2 | — | — |
|   Steam | 84.76 | — | — | 110.39 |
| Generator Operation | | | | |
|   Reaction zone temperature, °F. | 2360 | 2700 | 2550 | 3000 |
|   Pressure, psig | 30 | 30 | 30 | 30 |
|   Time in reaction zone, sec. | 1.01 | 1.01 | 1.00 | 1.0 |
| Product Gas SCFH (wet basis) | | | | |
| Composition, mole % | | | | |
|   $H_2$ | 47.00 | 46.13 | 53.86 | 38.14 |
|   CO | 41.00 | 45.28 | 31.71 | 46.31 |
|   $CO_2$ | 2.07 | 1.38 | 1.56 | 3.88 |
|   $H_2O$ | 7.05 | 5.01 | 8.64 | 10.81 |
|   $CH_4$ | 0.02 | 0.02 | 0.02 | 0.03 |
|   $H_2S$ | 0.28 | 0.30 | — | 0.44 |
|   $N_2$ | 1.64 | 1.74 | 4.10 | 0.21 |
|   A | 0.12 | 0.13 | 0.11 | 0.14 |
|   COS | 0.02 | 0.02 | — | 0.04 |
| Performance | | | | |
|   Reducing Ratio, mole ratio $H_2+CO/H_2O-CO_2$ | 9.75 | 14.31 | 8.4 | 5.8 |
|   Unconverted Carbon (soot yield), % of C in fuel | 2.00 | 2.00 | 0.04 | 2.0 |
|   Free Oxygen/Fuel Ratio, SCF/lb. | 12.81 | 13.61 | 12.70 | 14.6 |
|   Carrier/Fuel Ratio, lb./lb. | 0.46 | 0.52 | — | — |
|   Oxygen/Carbon Ratio, atom/atom | 1.05 | 1.11 | 1.30 | 1.08 |
|   Free Oxygen Consumption, SCF/M SCF $H_2+CO$ | 263.64 | 289.42 | 252 | 328 |
|   SCF of $H_2+CO$ per lb. of Fuel Oil | 73.7 | 71.4 | — | 44.6 |
|   $H_2+CO$, MSCFH | 26.33 | 24.3 | 24.0 | 20.7 |

*An additional 920 SCFH of Natural Gas is required to preheat Natural Gas feed to 1000°F.

We claim:

1. A process for producing gaseous mixtures comprising principally hydrogen and carbon monoxide comprising simultaneously introducing into the reaction zone of a free-flow unpacked noncatalytic gas generator a free-oxygen containing gas, a liquid hydrocarbonaceous fuel, a methane-rich gas comprising at least 22 mole % of methane and $H_2O$ from and external source, said free-oxygen containing gas comprising 0.6 to 1.2 atoms of free oxygen per atom of cabon present in the reaction zone, said methane rich gas comprising fuel gas comprising principally $H_2$, CO, and $CH_4$.

3. The process of claim 1 wherein said liquid hydrocarbonaceous fuel is selected from the group consisting of liquefied petroleum gas; heavy fuel oil, petroleum distillates and residua, gasoline, naphtha, kerosene, crude petroleum, reduced crude, asphalt, gas oil, residual oil, shale oil, tar-sand oil, aromatic hydrocarbons such as benzene, toluene, xylene, coal tar; cycle gas oil from fluid catalytic cracking operations, furfural extract of coker gas oil; aldehydes, ketones, alcohols, organic waste liquors having some fuel value, and mixtures thereof.

4. The process of claim 3 wherein said liquid hydrocarbonaceous fuel is a slurry comprising a liquid hydrocarbonaceous fuel selected from the group in claim 3 and a dry solid carbonaceous fuel selected from the group consisting of petroleum coke, shale, tar sands, and coke from coal, or coal.

5. The process of claim 1 wherein said free-oxygen containing gas is selected from the group consisting of substantially pure oxygen, oxygen-enriched air, and air.

6. A process for producing reducing gas, fuel gas, or synthesis gas comprising continuously introducing into the reaction zone of a free-flow unpacked noncatalytic gas generator by way of the annulus of an annulus-type burner at a velocity in the range of about 30 feet per second to sonic velocity a dispersion comprising from about 0.25 to 0.75 parts by weight of methane-rich gas for each part by weight of a liquid hydrocarbonaceous fuel said methane-rich gas containing at least 22 mole % methane- and from about 0.05 to 0.20 parts by weight of $H_2O$ from an external source per part by weight of the combustible fuel in said reaction zone; simultaneously and continuously introducing into said reaction zone by way of the center conduit of said annulus burner so as to impinge and mix with said dispersion a stream of free-oxygen containing gas at a velocity in the range of about 30 feet per second to sonic velocity, wherein the atomic ratio of free oxygen in said free-oxygen containing gas to carbon in the fuel is in the range of about 0.6 to 1.2; and reacting said materials in said reaction zone by partial oxdation at an autogenous temperature in the range of about 1,500° to 3,500°F. and at a pressure in the range of about 1 to 250 atmospheres; whereby a product gas stream is produced having a reducing ratio moles $H_2+CO/CO_2+H_2O$ of a least 9.

7. The process fo claim 6 wherein all or a protion of the $H_2O$ is fed to the generator mixed with the free-oxygen containing gas.

8. A process for producing reducing gas, fuel gas, or synthesis gas in the reaction zone of a free-flow unpacked noncatalytic gas generator provided with an axially aligned annulus-type burner for introducing materials into said reaction zone, wherein said annulus burner comprises a center conduit, an inner annulus passage disposed about and separated from said center conduit and an outer annulus passage disposed about and separated from said inner annulus passage, comprising continuously introducing into said reaction zone by way of said center conduit a first gaseous stream comprising a free-oxygen containing gas selected from the group consisting of air, oxygen-enriched air, and substantially pure oxygen, and where the atomic ratio of free oxygen in said free-oxygen containing gas to carbon in a liquid hydrocarbonaceous fuel is in the range of about 0.6 to 1.2; simultaneously and continuously introducing into said reaction zone by way of said inner annulus passage a second gaseous stream comprising a dispersion of about 0.25 to 0.75 parts by weight of methane-rich gas for each part by weight of said liquid hydrocarbonaceous fuel said methane-rich gas containing at least 22 mole % methane- and from about 0.05 to 0.20 parts by weight of $H_2O$ from an external source per part of the combustible fuel in said reaction zone; simultaneously and continuously introducing into said reaction zone by way of said outer annulus a third gaseous stream selected from the group consisting of air, oxygen-enriched air, nitrogen, a portion of the effluent gas from the gas generator that is cooled and recycled, and cooled cleaned and compressed off-gas from an ore reduction zone; and said first, second and third gaseous streams being introduced into said reaction zone at velocities in the range of about 30 feet per second to sonic velocity and in amounts to provide by partial oxidation an autogenous reaction temperature in the range of about 1,500°to 3,500°F. at a pressure in the range of about 1 to 250 atmospheres, thereby producing a product gas stream substantially comprising $H_2$, $CO$, $CO_2$, $H_2O$, $CH_4$, and a small amount of particulate carbon.

9. The process of claim 8 wherein said product gas stream has a reducing ratio moles $H_2+CO/CO_2+H_2O$ of at least 9.

* * * * *

UNITED STATES PATENT OFFICE
CERTIFICATE OF CORRECTION

PATENT NO. : 3,884,648
DATED : May 20, 1975
INVENTOR(S) : WILLIAM B. CROUCH

It is certified that error appears in the above-identified patent and that said Letters Patent are hereby corrected as shown below:

| | |
|---|---|
| column 6 line 60 | After "from" delete --the-- |
| Claim 1 line 9 | Change "cabon" to --carbon-- |
| Claim 7 line 1 | Change "fo" to --of-- and change "protion" to --portion-- |

Signed and Sealed this twenty-third Day of March 1976

[SEAL]

Attest:

RUTH C. MASON
Attesting Officer

C. MARSHALL DANN
Commissioner of Patents and Trademarks